May 1, 1945.  E. F. BASSLER  2,374,659
AUTOMATIC FEEDER FOR LUMBER GRADING TABLE
Filed Nov. 17, 1941  2 Sheets-Sheet 2
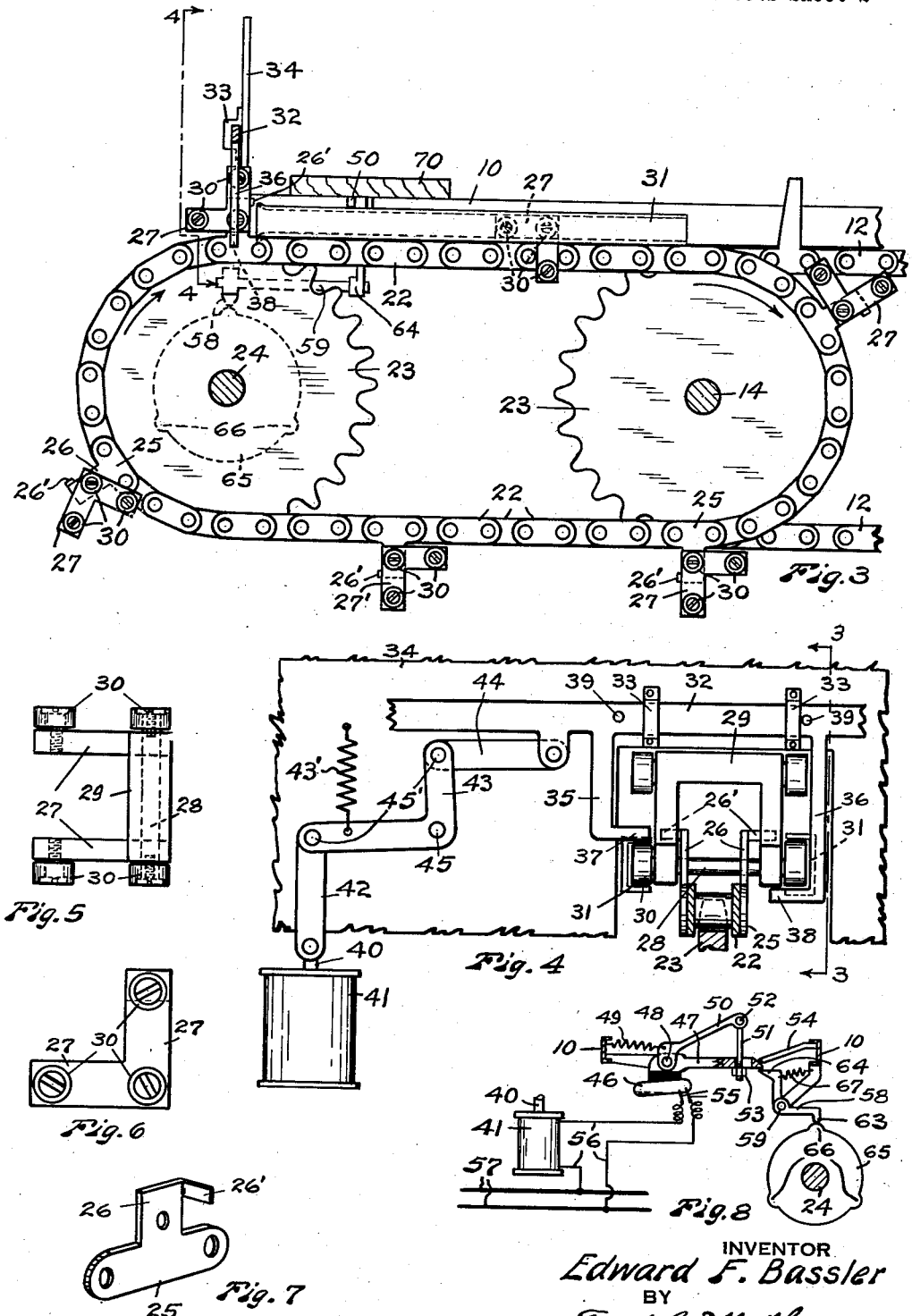
INVENTOR
Edward F. Bassler
BY
Fred C. Matheny
ATTORNEY Patented May 1, 1945

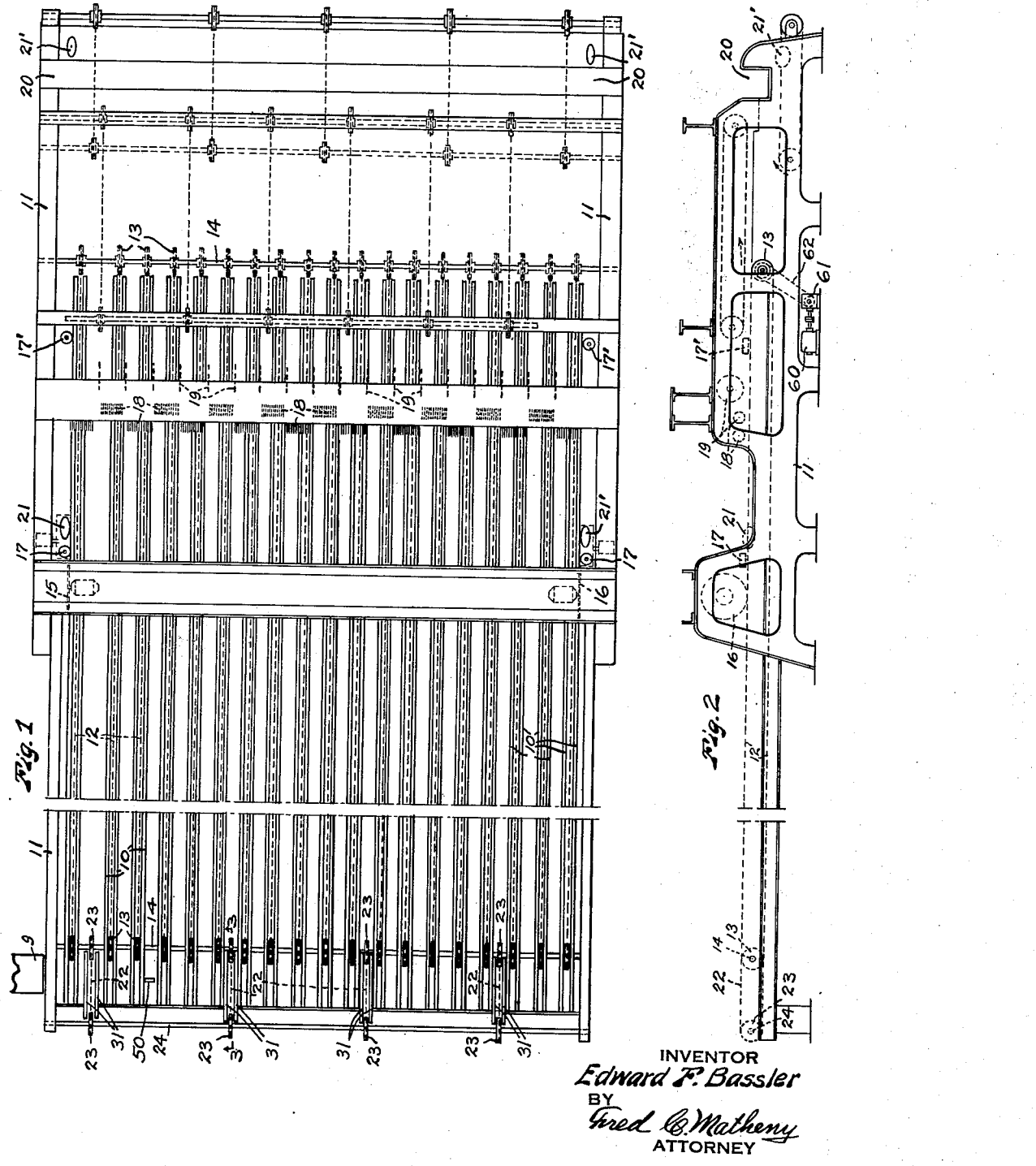

2,374,659

UNITED STATES PATENT OFFICE 2,374,659

AUTOMATIC FEEDER FOR LUMBER GRADING TABLES

Edward F. Bassler, Lake Stevens, Wash.

Application November 17, 1941, Serial No. 419,449

6 Claims. (Cl. 198—21)

This invention relates to an automatic feeder for a lumber grading table and the object of this invention is to provide automatic feeder means to take lumber as it is discharged from a planer and transfer it, one piece at a time, across a grading table in a direction at right angles to the length of the pieces of lumber and a direction at right angles to the direction in which the lumber is traveling when it leaves the planer.

Another object is to provide automatic lumber feeding means comprising a plurality of endless traveling link belts having normally retracted lumber transfer brackets adjustably connected therewith and having devices controlled by the delivery of lumber onto said lumber feeding means for moving said brackets into a lumber engaging position so that said brackets will engage with and transfer pieces of lumber, one at a time, from said lumber feeding means to any suitable lumber conveying means for feeding the pieces of lumber to machines which do work on the lumber.

Much lumber now being manufactured is end trimmed, printed either on the end or on the edge or both, check sealed on the ends, and is calibrated or has guide lines or graduations marked thereon.

The printing consists usually in marking trade names or grade marks on the lumber. The end trimming consists in trimming the ends of each piece of lumber squarely and sizing the piece to an exact longitudinal dimension. The calibrating consists in marking or longitudinally graduating each piece of lumber usually in inches and feet and applies usually to dimension lumber for the framing of buildings. Check sealing consists in applying shellac or varnish to the trimmed ends of pieces of lumber to retard checking and cracking and absorption of moisture.

In the handling of lumber in a planing mill it has heretofore been common practice to have the lumber discharge from the planer onto a sorting table where it is sorted and graded and manually placed on different trucks according to grade. The lumber which is below a predetermined standard, commonly called the rip and trim, is usually sent back for re-manufacture. The better grades are usually taken, in the trucks, to storage sheds and unloaded, usually by an electric crane. At a later date the better grade lumber from the storage sheds is picked up, usually by an electric crane, and transported either to a machine for end trimming, end printing and check sealing or to a different machine for end trimming, end printing, check sealing, calibrating and edge printing. It has heretofore been common practice to use two different machines for the work just described, flat lumber such as siding, flooring, finishing lumber and the like being end trimmed, end printed and check sealed in one machine and dimension lumber being passed through the other machine which is equipped with the calibrating means. Each machine when operating requires a crew of four to six men in addition to a crane operator.

The lumber, after passing through one of the machines above mentioned, will ordinarily be loaded into cars or the like for shipment. This heretofore used method of end trimming, end printing, calibrating, check sealing and edge printing the lumber involves needless handling of the lumber which necessarily increases the cost of production of the finished product.

It is an object of my invention to do away with much of the above described needless handling of the lumber on which any one or more of the operations of end trimming, end printing, edge printing, check sealing and calibrating are to be carried out and to thus reduce the cost of production of that lumber by making it possible to take said lumber as it comes from the planer and pass it, one piece at a time, over a combined sorting table and machine from which the poorer grades of lumber may be removed and the better grades may, at the option of an operator, be prepared for market by one or more of the operations above mentioned. Thus the lumber, before it goes to the storage sheds, may be end trimmed, printed and check sealed or it may be end trimmed, calibrated, printed and check sealed and re-handling of said lumber for the purpose of these operations is avoided.

Any one or more of the operations of my machine may be performed on any grade or type of lumber including timbers of larger cross sectional dimensions than ordinary framing lumber. The handling of the lumber required by my machine is only about one third of that required by machines heretofore used and a proportional saving in time of the lumber handling crane and crane operator results.

By the use of my invention, herein disclosed, it is possible to take all of the lumber as it discharges from the planer and end trim, print, check seal, and if desired, calibrate said lumber thus completing the manufacture of said lumber and making it ready for the market before the lumber ever goes to the storage sheds.

In the accompanying drawings,

Figure 1 is a somewhat diagrammatic plan view showing my automatic feeder installed in connection with a lumber grading table and with machines for squaring up, calibrating, printing and check sealing the lumber.

Fig. 2 is a somewhat diagrammatic side elevation of the same.

Fig. 3 is a view partly in side elevation and partly in section taken substantially on broken lines 3—3 of Figs. 1 and 4, and on a larger scale than Fig. 1, showing my automatic feeder.

Fig. 4 is a fragmentary view partly in elevation and partly in section taken substantially on broken line 4—4 of Fig. 3, and on a larger scal than Fig. 3.

Fig. 5 is a detached plan view of a lumber engaging lug.

Fig. 6 is a side elevation of the lug shown in Fig. 5.

Fig. 7 is a detached perspective view of a special chain link used in connection with this invention.

Fig. 8 is a diagrammatic view showing lumber actuated switch means and mechanical and electrical controls.

Like reference numerals designate like parts throughout the several views.

Figs. 1 and 2 show, somewhat diagrammatically, a lumber grading table comprising lonigtudinally disposed lumber supports 10 mounted on upright frame means 11. A plurality of endless link belt conveyors 12, Fig. 3, are provided in connection with the supports 10 for moving lumber. The conveyors 12 are of conventional type. They are carried on sprocket wheels 13 on shafts 14. Suitable driving means, as motor 60, speed reduction gear 61 and link belt means 62 are provided for driving the shafts 14.

A planer 9, shown diagrammatically in Fig. 1, is positioned to direct lumber onto the forward end portion of the sorting table.

The lumber grading table is provided with any desired number of devices of any desired type for doing work on the lumber. Some of these devices are shown diagrammatically in Figs. 1 and 2. For instance, the table may be provided with a movable saw 15 and a fixed saw 16 for squaring up the ends of the pieces of lumber and sawing said pieces of lumber to an exact length. Beyond the saws 15 and 16 the grading table may have end printing means 17 and check seal applicator means 21. Also this table may have means 18 for calibrating the lumber in inches and means 19 for calibrating said lumber in feet. Also said table may have a second set of printing devices 17'. Also it may have edge printing means 20 and a second set of check seal applicator devices 21' for applying a varnish or the like to the ends of each piece of lumber to prevent the same from checking. Other devices may be provided for doing other work on the lumber to make it ready for the market.

Preferably the end printing devices 17 and check seal applicator means 21 next adjacent the saws 15 and 16 are adjustably mounted so that they may be used for lumber that is to be squared up but is not to be calibrated. When the lumber is to be both squared up to an exact length and calibrated it will usually be end printed and check sealed by devices 17' and 21'.

The saws 15 and 16, printing devices 17, 17' and 20, calibrating devices 18 and 19 and check seal applicators 21 and 21' are all of well known form and are not herein described in detail.

The automatic feeder means constituting this invention consists of a plurality of endless traveling link belt conveyors 22 positioned at the head end of the lumber sorting table and operable on sprocket wheels 23. This automatic feeder means is adapted to receive the lumber as it comes from a planer 9 and transfer said lumber to the link belt conveyors 12. A fragment of the planer 9 is shown in Fig. 1.

In Fig. 1, I have shown diagrammatically four of the automatic link belt conveyors 22 of duplicate construction but it will be understood that a greater or less number of said link belt conveyors may be used, depending on the width of the sorting table and the length of the pieces of lumber to be handled.

The sprocket wheels 23 at the inner ends of the link belt conveyors 22 are mounted on the same shaft 14 that carries the adjacent sprocket wheels 13 of the link belt conveyors 12. The sprocket wheels 23 at the outer end of the link belt conveyors 22 are mounted on a shaft 24.

The automatic feeder units are of duplicate construction and the following description will apply equally well to any one of said automatic feeder units.

Each automatic feeder unit comprises one of the link belts 22 carried on two of the sprocket wheels 23. At regular intervals each link belt 22 is provided with pairs of special links 25, Fig. 7, having outwardly projecting members 26 which terminate in transversely protruding stop portions 26'.

Lumber transfer brackets 27 are pivotally mounted by pivot pin means 28 on the special links 25, see Fig. 4. Each lumber transfer bracket 27 preferably comprises two spaced apart side members of substantially bell crank or L shape connected with each other by an integral cross bar portion 29. The pivotal connection of the lumber transfer brackets 27 with the special links 25 is at the location where the two arms of said bell crank shaped brackets 27 join together or merge.

Each lumber transfer bracket 27 preferably has six rollers 30 rotatably mounted thereon, two of said rollers being on the extremities of the pivot pin 28 and two on the outer extremities of each leg of the bell crank shaped bracket. The three rollers 30 on each side of the bracket 27 are thus arranged in triangular formation with their axes at the apices of a triangle.

The rollers 30 are adapted to run in track members 31 of channel shaped cross section. Two of the track members 31 are positioned just above the upper lap of each link belt 22 parallel with the said link belt and at opposite sides thereof with their flanges directed inwardly toward the link belt and toward each other.

Preferably the plane of the top portions of the chambers 31 is below the plane of the top surfaces of the lumber supports 10.

As the link belts 22 move in the direction shown by the arrows in Fig. 3 some of the rollers 30 on the lumber transfer brackets 27 enter between the flanges of the members 31 and travel to the right, Fig. 3, throughout the length of said members 31 and leave said members 31 just as they begin to pass around the sprocket wheels 23 on shaft 14.

The rollers 30 on the pivot pins 28 and the corresponding rollers 30 on the end portions of one set of arms of the lumber transfer brackets 27 will travel within the lumber supporting track members 31 when the brackets are moving with the upper lap of the conveyor. If the rollers 30 on one arm of a lumber transfer bracket 27 are within the track members 31 then that arm of said lumber transfer bracket will be positioned substantially parallel to the track members 31 and the other arm of the lumber transfer bracket 27 will be positioned substantially perpendicular to the track members 31. The perpendicularly positioned arm may either extend upwardly or downwardly. If the said perpendicularly positioned arm extends upwardly it will be in a position to engage with and transfer any piece of lumber that its supported on the lumber supports 10 and extends crosswise thereof. If the said perpendicular arm extends downwardly then the lumber transfer bracket 27 will be entirely below the plane of the lumber supporting members 10 and out of the way and a piece of lumber may be delivered by the planer 9 onto the lumber supporting members 10 without danger of damaging the lumber transfer brackets 27.

The positioning of the lumber transfer brackets 27 is controlled by the lumber that is discharged from the planer 9 onto the lumber support formed by the members 10 to the extent that when there is a piece of lumber on the supports 10 above the link belts 22 the brackets 27 will automatically be angularly moved into an upwardly protruding position as they approach the piece of lumber so that they will engage with and move the said piece of lumber but when no piece of lumber is present on the lumber supports above the link belts 22 the brackets 27 will either be pivotally moved into a downwardly protruding position or will remain in a downwardly protruding position so that they will be out of the way of any lumber that is being delivered by the planer onto the lumber supports.

The control means for the brackets 27 of each link belt 22 comprises a bracket positioning member 32 supported for sliding movement by clip members 33 that are secured to a plate 34 at the head end of the lumber transfer means. Preferably the bracket positioning member 32 extends entirely across the head end of the machine and controls all of the transfer units on the machine. This member 32 is shown partly broken away in Fig. 4. This member 32 is provided at the location of each transfer unit with two downwardly extending arms 35 and 36 that are positioned on opposite sides of the adjacent link belt 22. The two arms 35 and 36 are respectively provided with two trip members 37 and 38 that project at right angles from the arms 35 and 36 and extend inwardly toward each other and are movable into and out of the path of the lumber transfer brackets 27 to bring about the proper positioning of the brackets 27 as they move toward the track members 31. This positioning of the brackets 27 occurs just before the rollers 30 on said brackets 27 enter between the flanges of the track members 31.

The trip member 37 on each arm 35 is positioned above the path of the pivot pins 28 which carry the lumber transfer brackets 27 so that when it is moved into the path of the lumber transfer brackets 27 it will be engaged by, and will pivotally move, any traveling lumber transfer bracket 27 which projects above the plane of the track members 31 downwardly into a position in which said bracket 27 will be out of the way of any pieces of lumber being delivered onto the members 10 from the planer 9.

The trip member 38 on each arm 36 is positioned below the path of travel of the pivot pins 28 so that when it is moved toward the link belt 22 into the path of the traveling lumber transfer brackets 27 it will be engaged by any downwardly projecting bracket arm of any bracket 27 that passes it and will pivotally move said bracket 27 so that one arm thereof will project upwardly in lumber engaging position. Figs. 3 and 4 show the trip member 38 in bracket engaging position whereby a bracket 27 will be moved into a raised or lumber transferring position.

Stop pins 39 are provided in the bracket positioning member 32 for engagement with the clips 33 to limit the movement of the member 32 in both directions.

One means for controlling the movement of the member 32 by the delivery of pieces of lumber onto the lumber supporting members 10 is to connect the member 32 with the plunger 40 of a solenoid 41. This connection may be made by means of a link 42, bell crank lever 43 and link 44. The bell crank lever 43 is fulcrumed on a pivot 45 and is connected with links 42 and 44 by pivots 45'. The solenoid 41, when energized, is adapted to move the member 32 to the left into the position shown in Fig. 4. A spring 43' is adapted to move the member 32 to the right from the position shown in Fig. 4 when the solenoid 41 is not energized.

Preferably the solenoid 41 is controlled by an electric switch, such as mercury tube switch 46. The switch 46 is carried by an arm 47 that is fulcrumed on a pivot 48. A control arm 50 is also fulcrumed on the pivot 48 and the two parts 47 and 50 are relatively angularly movable, at least one of these parts being freely movable on the shaft 48. Spring 49 yieldingly urges arm 50 upwardly. In its raised position, as shown in Fig. 8, the control arm 50 extends above the plane of the lumber supports 10 where it will be in the path of lumber coming from the planer 9. A rod 51 is connected by a pivot 52 with the control arm 50 and is slidable through the arm 47 that carries the switch 46. A nut 53 is provided on the rod 51. Upward movement of both members 47 and 50 is limited by a stop member 54. The pivot 48 is near one end of the switch carrying member 47 and the other end portion of said member 47 will tend to drop downwardly if unsupported. When the control member 50 is depressed by a piece of lumber 70 the switch carrying member 47 will move downwardly therewith unless it is held in a raised position, as hereinafter explained. If the member 47 is held in a raised position when the control member 50 is depressed the rod 51 will slide through the member 47 and said member 47 will drop downwardly by gravity, when released, and close the switch 46.

The mercury tube switch 46 has terminals 55 near one end thereof. The terminals 55 are connected by conductors 56 with the solenoid 41 and with source of energy conductors 57. When the member 47 is angularly moved downwardly from the position shown in Fig. 8, the terminals 55 will be electrically connected with each other and the circuit through the solenoid 41 will be closed.

Safety devices are provided to prevent movement of the bracket positioning member 32 while a lumber transfer bracket 27 is being positioned thereby. One way of accomplishing this is herein disclosed and comprises providing means for preventing downward movement of the member 47 in the event the control arm 50 should be depressed by an oncoming piece of lumber while a lumber transfer bracket is being angularly moved to properly position it for entry into the track members 31. This safety device precludes danger of jamming the bracket positioning member 32 against a lumber transfer bracket 27.

The means shown in Fig. 8, for preventing downward movement of the member 47 while a lumber transfer bracket is passing the positioning member 32 comprises a lever member 58 secured on a pivot shaft 59. The lever member 58 has one portion 63 that engages with a cam wheel 65. Another lever 64 is fixedly secured to the shaft 59 and is adapted to engage beneath the end portion of the member 47 that carries the switch 46. The cam wheel 65 is rigid with the shaft 24 and has three equidistantly spaced cam lobes 66 thereon. A tension spring 67 yieldingly urges the lever member 58 against the cam wheel 65. In the diagrammatic showing in Fig. 8 the cam wheel is positioned ninety degrees as respects its true position relative to the lumber supports 10.

The sprocket wheels 23 on shaft 24 are of the proper size so that each one third of a revolution thereof will bring one of the lumber transfer brackets 27 into a position of alignment with the bracket positioning member 32. The cam lobes 66 are positioned so that when the brackets 27 are thus aligned, the portion 64 of bell crank 58 will be in blocking position as respects the switch carrying member 47. If a piece of lumber lands on the control arm 50 when the bell crank 58 is in the blocking position shown in Fig. 8, the control arm 50 will be depressed but the member 47 will not be moved downwardly until after the bell crank part 63 has dropped off of the lobe 66. This will not occur until after the shaft 24 has advanced far enough so that the bracket 27 is clear of the positioning member 32. In Fig. 4, the parts are shown in the positions they would occupy when the solenoid 41 is energized. A spring 43' tends to move the bracket positioning member 32 to the right from the position in which it is shown in Fig. 4. When the solenoid 41 is not energized the spring 43' will move the positioning member 32 to the right from the position shown in Fig. 4 and the stop 37 will be in the path of movement of the lumber transfer brackets and will move each bracket angularly into an inoperative and out of the way position as the bracket approaches the track members 31.

When a piece of lumber 70 is discharged from the planer 9 it will rest upon and depress the trip lever 50 and this will close the switch 46 and energize the solenoid 41, causing solenoid 41 to move the member 32 into the position shown in Fig. 4. This retracts the stop lug 37 and positions the stop lug 38 in the path of the bracket members 27 so that, as any bracket member 27 approaches the trackways 31 it will be moved into a position with one arm thereof projecting upwardly whereby it will engage with the piece of lumber 70 and transfer said piece of lumber to the endless traveling link belts 12 by which said piece of lumber will be started on its movement across the sorting table and to the successive pieces of mechanism for doing work thereon such as end trimming, calibrating, printing, etc.

The switch 46 shown in Fig. 8 is a mercury tube switch but obviously other types of switches may be used. I have shown the switch 46 and solenoid 41 to be connected in series by the conductor means 56 with source of energy wires 57. Obviously the switch 46 may operate through a relay, in well known manner, to control the operation of the solenoid 41.

In the operation of this device one piece of lumber at a time is delivered from the planer 9 onto the lumber support formed by the portions of members 10 that are positioned above the link belts 22. At the time a piece of lumber 70 is being delivered from the planer the portions of the lumber supports 10 directly above the link belts 22 will be clear of lumber and all of the bracket members 27 that are in longitudinal alignment with the oncoming lumber will be entirely below the plane of the said members 10 so that there will be no possibility of the end of the oncoming piece of lumber striking against one of these brackets as it is being delivered. As it is delivered onto the members 10 each piece of lumber drops on the switch lever 50 and will operate the switch 46. This energizes the solenoid 41 and moves the bracket positioning member 32 into a position to raise the next bracket or set of said brackets 27 so that they will engage with the said piece of lumber and transfer it to the sorting table conveyors 12 before another piece of lumber is delivered by the planer.

Each piece of lumber that is thus delivered to the automatic feeder will be moved to one side completely out of the way before another piece of lumber is delivered by the planer. Also the upstanding bracket members 27 that engage with each piece of lumber will have moved completely out of the path of delivery of the lumber before the next piece of lumber is delivered and any bracket members 27 that are in line with a piece of lumber which is being delivered to the transfer device will be in the retracted or out of the way position. It is to be understood that the delivery of pieces of lumber from the planer will be at irregular intervals as the planer will usually be fed by hand.

The brackets or lugs 27 will not tip as they are firmly supported by the channels 31. If desired the link belts 22 that carry the brackets 27 can extend the full length of the machine and replace the link belts 12.

From the automatic feeder the pieces of lumber pass over the grading table where pieces that are not up to the required grade may be manually removed before they reach the saws.

The pieces of lumber that are not removed on the grading table will be subjected to further operations. If dimension lumber is being manufactured said pieces will be trimmed to an accurately measured length and squared up by the saws 15 and 16, then calibrated in feet and inches by the calibrating devices 18 and 19, then end printed and edge printed by the printing devices 17' and 20' and finally will have varnish or like sealing material applied to their ends by the check seal applicators 21'. When dimension lumber is being manufactured the printing devices 17 and check seal applicators 21 will ordinarily be retracted out of the way of the lumber. When siding or like flat lumber is being manufactured the printing devices 17 and check seal applicators 21 will be used and the lumber after passing saws 15 and 16 and printing devices 17 and 21 will be manually removed from the table before it reaches the calibrating devices.

The saws, the printing devices, the calibrating devices and the check seal applicators are all of well known form now in common use and are not herein described in detail. Obviously any of these devices may be dispensed with and other devices may be provided for working on the lumber without in any way affecting the operation of this lumber feeding means.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. In an automatic lumber feeder, lumber supporting means; an endless traveling link belt having one run thereof movable across said lumber supporting means below the plane of the lumber supporting means; channel shaped guide tracks positioned at the sides of the upper run of said endless traveling link belt, lumber transfer brackets pivotally connected with said endless traveling link belt; and three rollers on the outer sides of said lumber transfer brackets arranged in triangular formation, one of said rollers being coaxial with the pivotal connection of the brackets and the link belt, the coaxial roller always following the trackways and one of the other rollers following the trackways to hold the bracket retracted or upright.

2. In an automatic lumber feeder, lumber supporting means; an endless traveling link belt having one run thereof movable across said lumber supporting means below the plane of the lumber supporting means; channel shaped guide track means positioned at a side of the upper run of said endless traveling link belt; lumber transfer brackets pivotally connected with said endless traveling link belt; three rollers on an outer side of each lumber transfer bracket arranged in triangular formation, one of said rollers being coaxial with the pivotal connection of the bracket and the link belt, the coaxial roller and one of the other rollers always following the guide track means; and control means positioned adjacent the head of said channel shaped guide track means selectively operable to rotatively position said bracket in a lumber engaging position or in a position retracted below the plane of the lumber supporting means.

3. In a automatic lumber feeder, lumber supporting means; an endless traveling link belt having one run thereof movable across said lumber supporting means below the plane of the lumber supporting means; channel shaped guide tracks positioned at the respective sides of the upper run of said endless traveling link belt; lumber transfer brackets pivotally connected with said endless traveling link belt; three rollers on each side of said lumber transfer brackets arranged in triangular formation, two of said rollers being coaxial with the pivotal connection of the brackets and the link belts, the coaxial rollers always following the trackways and one of the other two pairs of rollers following the trackways to hold the bracket either in an operative or retracted position; control means positioned adjacent the head portion of said channel shaped guide tracks selectively operable to rotatively position said bracket in a retracted or upright position as the rollers on said bracket enter said channel shaped guide tracks; and means operable to prevent a change of position of said control means at the time said rollers are passing into said channel shaped guide tracks.

4. In an automatic lumber feeder, lumber supporting means; an endless traveling link belt having one run thereof movable across said lumber supporting means in a plane below the plane of the lumber supporting means; channel shaped guide tracks positioned at the respective sides of said run of said link belt; lumber transfer brackets pivotally connected with said endless traveling link belt for movement into an upwardly projecting or a retracted position, each lumber transfer bracket being of L shape in side elevation and having three rollers rotatively mounted on each side thereof in triangular formation adjacent the three respective corners of the bracket, the two rollers which are positioned adjacent the junction of the two limbs of the bracket being coaxial with the pivotal connection of the bracket with the link belt so that said two rollers will always follow the guide tracks and the bracket being selectively movable to position the rollers adjacent the extremity of either arm thereof in alignment with said guide tracks; and control means positioned at the head of said guide tracks to selectively position said brackets in upwardly projecting or retracted position as the rollers thereon are passing into said guide tracks.

5. In an automatic lumber feeder, lumber supporting means; an endless traveling link belt having one run thereof movable across said lumber supporting means in a plane below the plane of the lumber supporting means; outwardly projecting lugs on said link belt; channel shaped guide tracks positioned at the sides of the upper run of said endless traveling link belt with their channel shaped sides turned toward the belt; lumber transfer brackets pivotally connected with said lugs, each lumber transfer bracket being of L shape in side elevation with two L shaped portions positioned on opposite sides of the belt and a cross bar portion connecting said two L shaped sides and extending across the belt; three rollers rotatively mounted on each L shaped portion of each bracket adjacent the three extremities of the bracket; and control means positioned adjacent the head end portions of said guide tracks to rotatively position said brackets whereby each bracket may be guided into the guide members with all arms thereof below the plane of the lumber supporting means or with an arm thereof projecting above the plane of the lumber supporting means.

6. In an automatic lumber feeder, lumber supporting means; an endless traveling link belt having one run thereof movable across said lumber supporting means in a plane below the plane of the lumber supporting means; channel shaped guide tracks positioned at the sides of the upper run of said endless traveling link belt with their channel shaped sides directed toward the belt; lumber transfer brackets pivotally connected with said endless traveling link belt, three rollers on each side of each lumber transfer bracket arranged in triangular formation, two of said rollers being coaxial with the pivotal connection of the bracket and the link belt; a movable control bar positioned adjacent the head ends of said guide members, said control bar having one trip member positioned above and another trip member positioned below the path along which the pivots of the brackets travel as the brackets approach the head end of the guide members; and means adapted to move said control bar to selectively position either one of said trip members in the path of said brackets and the other trip member clear of the path of said brackets whereby each bracket may be guided into the guide members with all arms thereof below the plane of the lumber supporting means or with one arm thereof projecting above the plane of the lumber supporting means.

EDWARD F. BASSLER.